United States Patent Office 2,955,921
Patented Oct. 11, 1960

2,955,921

METHOD OF RECOVERING HYDRAZINE HYDRATE FROM AN AQUEOUS SOLUTION OF HYDRAZINE HYDRATE AND ACETONE

Günter Henrich, Opladen, Germany, assignor to Farbenfabriken Bayer Aktiengesellschaft, Leverkusen, Germany, a corporation of Germany No Drawing. Filed July 28, 1958, Ser. No. 751,173

Claims priority, application Germany Aug. 1, 1957

4 Claims. (Cl. 23—190)

The present invention relates to a production of hydrazine hydrate.

As is known, hydrazine hydrate can be separated from dilute aqueous solutions, such as are obtained by example, in the Raschig synthesis, by stepwise addition of acetone and distillation, whereby an aqueous solution of hydrazine hydrate containing acetone is obtained as distillate, the said hydrate being present in the solution as dimethyl ketazine. It is known to obtain salts from such a solution by decomposition with acids. Since several processes for obtaining hydrazine hydrate from hydrazine salts are known, a method is hereby provided for the production of hydrazine hydrate, in which however, one equivalent of acid and one equivalent of base are each required per one equivalent of hydrazine. This could be avoided if the hydrazine hydrate were to be recovered directly from the aqueous solution containing acetone.

It is also known that the acetone can be removed from such a solution by a distillation process carried out in stages with interposed delay vessels. However, a very high energy consumption is necessary for removing the acetone completely. The acetone can only be driven off economically and without difficulty up to a molar ratio of acetone to hydrazine of <1, for example 0.4.

The present invention is concerned with a process for obtaining hydrazine hydrate from an aqueous solution which contains acetone and which contains less than 1 mol of acetone per 1 mol of hydrazine hydrate, the said process consisting in that the solution is mixed with a liquid which has a low degree of solubility for acethydrazone but a good dissolving capacity for water and hydrazine hydrate, the acethydrazone settling on top being separated out and the hydrazine being isolated from the lower layer. On mixing such a solution with a concentrated aqueous solution of an alkali hydroxide, such as sodium hydroxide, potassium hydroxide, rubidium hydroxide or the like, two layers are formed, of which the upper layer contains practically all the acetone with the same number of mols of hydrazine in the form of substantially anhydrous acethydrazone, while the uncombined hydrazine is found in the lower aqueous alkali hydroxide layer. In order to carry out this separation of the acetone from the uncombined hydrazine in a substantially quantitative manner, it is necessary not to allow the concentration of alkali hydroxide in the lower layer to fall below 30%, and if possible not below 35%. Moreover, it is advantageous for the same purpose to carry out the separation at an elevated temperature of for example 90 to 100° C., since in this way the solubility of the acethydrazone in aqueous alkali solution is decreased considerably. For the same reason, the separation can also be carried out at high pressure, for example up to 10 atmospheres. After separating the layers, such a quantity of liquid is evaporated from the lower layer that the hydrazine hydrate is substantially driven off. The concentrated alkali hydroxide solution is preferably returned to the process for further separation of the acethydrazone.

The invention is illustrated by the following example without being restricted thereto.

Example 100 kg. of an aqueous solution containing 17.5 kg. of hydrazine hydrate and 7.5 kg. of acetone are mixed at 80° C. with 200 kg. of 50% sodium hydroxide solution. Two layers are formed, of which the upper layer consists of 9.5 kg. of acethydrazone and 0.5 kg. of water and the lower layer consists of 100 kg. of NaOH, 11 kg. of hydrazine hydrate and 179 kg. of water. The lower layer is distilled and concentrated to 50% NaOH. The vapour formed is fractionated, 11 kg. of hydrazine hydrate being obtained.

I claim:

1. Process for recovering hydrazine hydrate from an aqueous solution containing substantial amounts of hydrazine hydrate and acetone, said hydrazine hydrate and acetone being present in the solution in a proportion of less than 1 mol of acetone to each 1 mol of hydrazine hydrate, which comprises mixing the said solution with an aqueous solution of an alkali metal hydroxide, separating the two layers formed from one another such an amount of an alkali metal hydroxide solution being admixed with the aqueous solution containing hydrazine hydrate and acetone, that the resulting lower layer has a concentration of at least 30% of alkali metal hydroxide, the upper layer containing substantially all of the acetone present, the same having combined with the same number of mols of hydrazine in the form of substantially anhydrous acethydrazone, the lower layer containing the uncombined hydrazine, the alkali metal hydroxide and the water and recovering the hydrazine hydrate from said lower layer.

2. Process according to claim 1 wherein the hydrazine hydrate is recovered by distillation of the lower layer.

3. Process according to claim 1 wherein the separation of the two layers is effected at a temperature of about 80 to about 100° C.

4. Process according to claim 1 wherein the separation is effected at a pressure of up to 10 atmospheres.

References Cited in the file of this patent

UNITED STATES PATENTS 2,690,378   Penneman _____ Sept. 28, 1954
2,774,725   Swenson et al. _____ Dec. 18, 1956

OTHER REFERENCES

Audrieth and Ogg: "The Chemistry of Hydrazine," John Wiley and Sons, Inc. New York, 1951, pages 44 and 45.